2,865,955

METHOD FOR SEPARATING WATER-SOLUBLE ALCOHOLS AND ESTERS

Alfons Ascherl, Franz Buttner, and Eduard Enk, Burghausen, Germany, assignors to Wacker-Chemie G. m. b. H., Munich, Germany, a German firm No Drawing. Application December 12, 1955
Serial No. 552,286

Claims priority, application Germany December 21, 1954

5 Claims. (Cl. 260—499)

The present invention relates to a method for completely separating methanol and methyl acetate.

Many chemical processes yield mixtures of alcohols and esters, for example when producing polyvinyl alcohol, or at the synthesis of acetyl acetone and acetoacetic ester, or when saponifying esters. A complete separation of alcohols and esters is almost impossible because they form azeotropic mixtures in many cases. Constantly boiling mixtures are expediently separated by extractive distillation or by extraction whereby the latter method is always preferred because distilling with great amounts of auxiliary liquids consumes more heat than the liquid-liquid extraction. On the other hand, the economy of an extraction depends on the separation effect which determines the number of extraction stages, the amount of solvent, and the steam consumption for working up the extract. For example, the separation of methylacetate-methanol by means of extractive distillation using water as an auxiliary liquid is known. Thereby methyl acetate containing 20 grams water per liter is obtained at the head of the extraction tower, the sump of the tower being formed by aqueous methanol. During the distillation so much water must be added that in the extraction part of the tower and in the retort about 91.5 mol percent water are always present. In order to separate 100 kg. methanol from a mixture containing 70% methyl acetate approximately 603 kg. water are required. The steam consumption of the extractive distillation and working up the aqueous methanol for obtaining 1 ton methanol which is free from water amounts to about 5.7 tons steam.

Mixtures of ester and alcohol can also be separated by extraction with aqueous salt solutions. If a mixture of 70% acetic acid ethyl ester and 30% ethanol is treated with the fourfold volume of 25 percent aqueous potassium acetate, an approximately 94 percent ester containing 2.5% to 3.0% water is obtained after the distillation. Since, in most cases, the ester must be returned to a manufacturing process, the great content of water is undesired. In order to produce 98 percent to 99 percent anhydrous ester distillation must be repeated with accompanying dehydration; this requires an additional operation consuming a considerable amount of steam, namely 2.5 tons of steam per ton of pure ester. A fundamental disadvantage of the extraction with aqueous salt solutions is the impossibility of separating mixtures containing much alcohol at suitable yields. If, for example, a mixture of 50% methanol and 50% methyl acetate is extracted with a saturated aqueous solution of calcium chloride, only 35 percent of the methyl acetate are obtained as 92.1 percent aqueous ester.

A simple extraction process has been found for separating methanol and methyl acetate which process accords considerable savings of heat. For example, a saving of 54.5% steam has been obtained relatively to the steam consumption involved when extracting with potassium acetate when separating a mixture of 50% methanol and 50% methyl acetate.

In the method according to the invention the methanol-methyl acetate mixture is treated with water, extracted with a halogenated hydrocarbon whose boiling point is lower than that of the ester, and which forms with the present methanol and water, but not with the methyl acetate, an azeotropic mixture having a minimum boiling point, whereupon the nonaqueous ester containing extraction layer is distilled whereby anhydrous methyl acetate remains, the methanol being obtained in the conventional manner from the aqueous extraction layer.

Suitable hydrocarbon halides are, for example, vinylidene chloride and methylene chloride.

The volumetric relation, for example, when extracting methanol-methyl acetate mixtures, which contain 50 or more parts methanol, with methylene chloride and water is about 1:1:0.75. Usually three extraction stages are sufficient for putting about 93% of the methanol into the aqueous layer and about 94% of the methyl acetate into the methylene chloride layer. The heat consumption for working up the extracts is considerably smaller than with conventional processes. The low boiling points of the respective extraction substances and their heats of evaporation which are usually below 100 calories per kg. make it possible to use waste heat as it is available, for example, in the form of steam condensate. If the layer containing the halogenated hydrocarbon is distilled, the methyl acetate remains in the retort. Since the small amounts of methanol and water which are contained in the nonaqueous extraction layer are azeotropically or pseudo-azeotropically transferred together with the halogenated hydrocarbon, a high percent anhydrous methyl acetate is obtained. The difference between the boiling points of the halogenated hydrocarbon and of the methyl acetate is greater than 20° C.; separation by distillation is therefore not difficult. The methanol is extracted from the aqueous extract of distillation in the conventional manner. The first runnings are a mixture of methyl acetate, methanol and halogenated hydrocarbon, the latter being returned to the extracting process. The bulk is methanol and water forming the distillation residue.

The number of extraction stages and the amount of water depends on the extracting agent and on the mixture to be separated; usually 3 to 5 stages are sufficient and the volumetric relation is 1:1:1. It has been found to be of advantage to add to the methanol-methyl acetate mixture only a part of the amount of water which is necessary for the separation and to extract the nonaqueous layer with the other part of the water and to distill thereafter. It usually makes no difference with respect to the separating effect whether mixing pumps and settling vessels or two extraction towers are used.

*Example 1*

500 cubic centimeters (427 grams) of a mixture of 50% methyl acetate and 50% methanol are mixed with 250 cubic centimeters water, the mixture being twice extracted, each time with 250 cubic centimeters (332.5 grams) methylene chloride. Each time two layers are obtained, one aqueous layer which contains the bulk of the methanol and a methylene chloride layer which contains the bulk of the methyl acetate. Both methylene chloride layers are combined and treated once more with 125 cubic centimeters water. The resulting aqueous layer is combined with the first obtained aqueous layer. Altogether the following is obtained:

592.8 grams aqueous extract including—  Grams
    1.98% methyl acetate_____ 11.7
    32.54% methanol_____ 192.9
    61.10% water_____ 362.2
    4.38% methylene chloride_____ 26.0
849.8 grams methylene chloride extract including—
    23.73% methyl acetate_____ 201.7
    1.70% methanol_____ 14.4
    1.12% water_____ 9.5
    73.45% methylene chloride_____ 624.2

When distilling the aqueous extract a first run of 40.3 grams is obtained which consists of 2.6 grams methanol, 11.7 grams methyl acetate and 26.0 grams methylene chloride. This first run is returned to the extraction process together with 50 percent methyl acetate. The main fraction (190.3 grams) is anhydrous methanol which corresponds to the theoretical amount of 88.9%.

The distillation residue is water.

The distillation of the methylene chloride layer yields 648.1 grams distillate which consists of 96.3% methylene chloride, 2.2% methanol, and 1.5% water. The distillation residue consists of 207 grams water and methyl acetate which is free from methanol and which corresponds to the theoretical amount of 94.4%.

Example 2

200 cubic centimeters (170 grams) of a mixture of 50% methyl acetate and 50% methanol are mixed with 150 cubic centimeters water and are twice extracted, each time with 100 cubic centimeters (132.15 grams) methylene chloride. The volumetric relation of 50 percent methyl acetate-water-methylene chloride is 1:0.75:1. After separation of the layers the following is obtained:

| 233.3 grams aqueous layer containing— | Grams |
|---|---|
| 3.18% methyl acetate | 7.4 |
| 30.97% methanol | 72.3 |
| 62.20% water | 145.1 |
| 3.65% methylene chloride | 8.5 |

85.0% of the methanol present in the 50 percent methyl acetate are contained in the aqueous extraction layer.

| 346.0 grams nonaqueous layer containing— | Grams |
|---|---|
| 22.30% methyl acetate | 77.15 |
| 2.56% methanol | 8.85 |
| 0.87% water | 3.0 |
| 74.27% methylene chloride | 257.0 |

Therefore, 90.7% of the methyl acetate are in the non-aqueous layer.

Both layers are distilled as in Example 1. The yield of anhydrous pure methanol is 70.4 grams corresponding to the theoretical yield of 82.8%, the yield of methyl acetate amounting to 77.15 grams corresponding to the theoretical yield of 90.7%.

What is claimed is:

1. In an extraction process for the separation of a mixture of methanol and methyl acetate, the steps which comprise adding at least 50% by volume of water to a mixture of methanol and methyl acetate, extracting the aqueous mixture thereby formed with a low-boiling, water-insoluble halogenated hydrocarbon whose boiling point is below that of the methyl acetate and which also forms a low-boiling ternary azeotrope with water and methanol and selected from the group consisting of methylene chloride and vinylidene chloride, separating the resulting aqueous and non-aqueous layers, subjecting the non-aqueous layer to distillation whereby methanol-free methyl acetate remains as the still residue, and separately distilling the aqueous layer whereby substantially anhydrous methanol is obtained as the distillate, the volumetric ratio of total water:halogenated hydrocarbon:methanol-methyl acetate employed in carrying out said separation being 0.75:1:1.

2. Process in accordance with claim 1 wherein only a part of the water required, but at least 50% by volume thereof, is added to the methanol-methyl acetate mixture being separated, the remainder of the water added then being used to extract the non-aqueous layer obtained to form a second aqueous extract and, after adding the second aqueous extract to the first aqueous layer, subjecting the aqueous and non-aqueous layers to distillation.

3. Process in accordance with claim 1 wherein the extractant is methylene chloride.

4. Process in accordance with claim 2 wherein the extractant is methylene chloride.

5. In an extraction process for the separation of a mixture of methanol and methyl acetate, the steps which comprise adding water to a mixture of methanol and methyl acetate, extracting the aqueous mixture thereby formed with methylene chloride, separating the resulting aqueous and methylene chloride layers, extracting the methylene chloride layer obtained with water, separating the aqueous layer from the methylene chloride layer and combining the said aqueous layers, subjecting the methylene chloride layer to distillation whereby methanol-free methyl acetate remains as the still residue, and separately distilling the combined aqueous layers whereby substantially anhydrous methanol is obtained as the distillate, the volumetric ratio of total water:methylene chloride:methanol-methyl acetate employed in carrying out said separation being about 1:1:1.

References Cited in the file of this patent

UNITED STATES PATENTS

| 1,541,430 | Mann | June 9, 1925 |
| 2,251,215 | Tindall | July 29, 1941 |
| 2,349,807 | Benedict | May 30, 1944 |
| 2,350,087 | Benedict | May 30, 1944 |
| 2,636,050 | Hoaglin et al. | Apr. 21, 1953 |

OTHER REFERENCES

Weissberger et al.: "Technique of Organic Chemistry" (1950), volume III, pp. 295–7.

Horsley et al.: "Azeotropic Data," published by American Chemical Society (1952), Table I, p. 6, No. 118; p. 9, No. 281; p. 22, No. 1032; p. 23, No. 1044; p. 30, No. 1503; p. 84, No. 4774.